(12) United States Patent
Harada et al.

(10) Patent No.: US 11,678,352 B2
(45) Date of Patent: Jun. 13, 2023

(54) USER TERMINAL

(71) Applicant: NTT DOCOMO, INC., Tokyo (JP)

(72) Inventors: Hiroki Harada, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 38 days.

(21) Appl. No.: 17/048,221

(22) PCT Filed: Apr. 15, 2019

(86) PCT No.: PCT/JP2019/016142
§ 371 (c)(1),
(2) Date: Oct. 16, 2020

(87) PCT Pub. No.: WO2019/203186
PCT Pub. Date: Oct. 24, 2019

(65) Prior Publication Data
US 2021/0168808 A1    Jun. 3, 2021

(30) Foreign Application Priority Data

Apr. 17, 2018 (JP) .............................. JP2018-090240

(51) Int. Cl.
*H04W 72/04* (2023.01)
*H04W 72/12* (2023.01)
(Continued)

(52) U.S. Cl.
CPC ....... *H04W 72/53* (2023.01); *H04W 72/0446* (2013.01); *H04W 72/0453* (2013.01); *H04W 72/1263* (2013.01); *H04W 72/23* (2023.01)

(58) Field of Classification Search
CPC ........... H04W 72/0493; H04W 72/042; H04W 72/0446; H04W 72/0453; H04W 72/1263
See application file for complete search history.

(56) References Cited

U.S. PATENT DOCUMENTS 11,553,445 B2 *  1/2023  Ko ......................... H04L 5/001
2013/0010757 A1   1/2013  Jang et al.
(Continued)

FOREIGN PATENT DOCUMENTS

| EP | 3188534 A1 | 7/2017 |
| JP | 2017-525250 A | 8/2017 |

(Continued)

OTHER PUBLICATIONS

Ericsson, R4-1802750, 'TA Offset for TDD LTE-NR coexistence', 3GPP TSG-RAN WG4 Meeting #86, Feb. 26-Mar. 2, 2018, pp. 1-3. (Year: 2018).*

(Continued)

*Primary Examiner* — Melvin C Marcelo
(74) *Attorney, Agent, or Firm* — Osha Bergman Watanabe & Burton LLP

(57) ABSTRACT

A decrease of a communication throughput is suppressed even when a plurality of radio access technologies (RATS) coexist. A user terminal according to an aspect of the present disclosure includes: a receiving section that receives information on a UL/DL configuration in a second carrier; and a control section that determines start timing of the UL/DL configuration in the second carrier based on an offset between a frame boundary in a first carrier and a frame boundary in the second carrier.

7 Claims, 11 Drawing Sheets

(51) Int. Cl.
  *H04W 72/53*     (2023.01)
  *H04W 72/0446*   (2023.01)
  *H04W 72/0453*   (2023.01)
  *H04W 72/1263*   (2023.01)
  *H04W 72/23*     (2023.01)

(56) References Cited

U.S. PATENT DOCUMENTS

| | | | |
|---|---|---|---|
| 2017/0019218 A1* | 1/2017 | Sadeghi | H04W 72/042 |
| 2017/0257788 A1  | 9/2017 | Takahashi et al. | |
| 2019/0357264 A1* | 11/2019 | Yi | H04W 74/008 |
| 2020/0163086 A1  | 5/2020 | Huang et al. | |
| 2021/0029764 A1* | 1/2021 | Chen Larsson | H04L 5/1469 |
| 2021/0126753 A1* | 4/2021 | Mochizuki | H04W 72/1268 |
| 2021/0307095 A1  | 9/2021 | Kim et al. | |

FOREIGN PATENT DOCUMENTS

| | | |
|---|---|---|
| WO | 2009114421 A2 | 9/2009 |
| WO | 2017034604 A1 | 3/2017 |

OTHER PUBLICATIONS

International Search Report issued in PCT/JP2019/016142 dated Jul. 2, 2019 (1 page).
Written Opinion of the International Searching Authority issued in PCT/JP2019/016142 dated Jul. 2, 2019 (4 pages).
CMCC; "Discussion on semi-static TDD configurations"; 3GPP TSG RAN WG1 Meeting #88, R1-1703410; Athens, Greece; Feb. 13-17, 2017 (5 pages).
Huawei, HiSilicon; "Dynamic and semi-static DL/UL resource partition"; 3GPP TSG RAN WG1 Meeting #91, R1-1719390; Reno, USA; Nov. 27-Dec. 1, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 19788970.2, dated Dec. 8, 2021 (9 pages).
Office Action issued in counterpart Japanese Patent Application No. 2020-514370 dated Apr. 4, 2023 (4 pages).

* cited by examiner

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D — DL SUBFRAME
U — UL SUBFRAME
S — SPECIAL SUBFRAME

FIG. 1

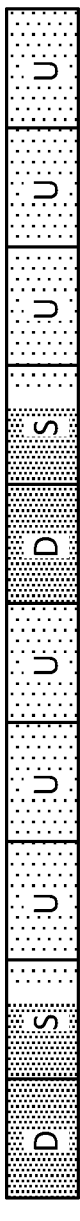
FIG. 4A
FIG. 4B
FIG. 4C

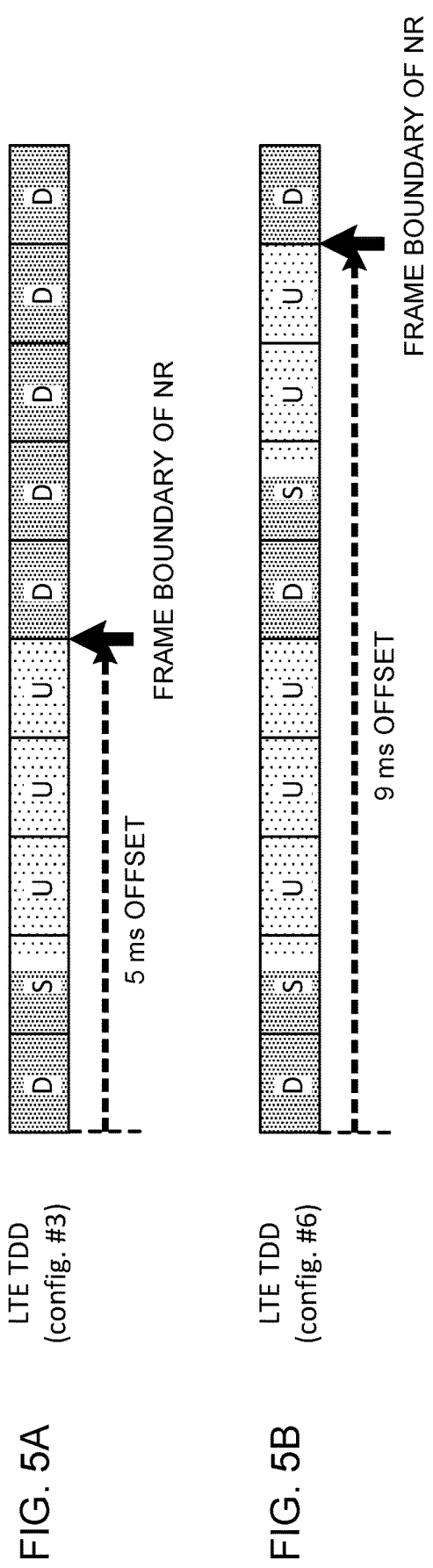

USER TERMINAL

TECHNICAL FIELD

The present disclosure relates to a user terminal in a next-generation mobile communication system.

BACKGROUND ART

In the UMTS (Universal Mobile Telecommunications System) network, the specifications of long-term evolution (LTE) have been drafted for the purpose of further increasing high speed data rates, providing lower delays, and the like (see Non Patent Literature 1). Further, the specifications of LTE-A (LTE Advanced, LTE Rel. 10, 11, 12, 13) have been drafted for the purpose of further increasing the capacity and sophistication of LTE (LTE Rel. 8, 9).

LTE successor systems (for example, referred to as FRA (Future Radio Access), 5G (5th generation mobile communication system), 5G+ (plus), NR (New Radio), NX (New radio access), FX (Future generation radio access), LTE Rel. 14 or 15 or later) are also under study.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a radio communication system in the future (hereinafter, also simply referred to as NR), use of a band close to that of an existing LTE system (for example, LTE Rel. 8-13) is also under study. In this case, if a Time Division Duplex (TDD) band is used in the band of LTE, then it is desirable that an NR UL/DL configuration (UL-DL Configuration) be operated so as to be synchronized with a UL/DL configuration of LTE.

However, there is a problem that a communication throughput and the like decrease when setting of the UL/DL configuration of NR, which has been studied so far, is used.

Accordingly, it is an object of the present disclosure to provide a user terminal capable of suppressing the decrease of the communication throughput even when a plurality of RATs coexist.

Solution to Problem

A user terminal according to an aspect of the present disclosure includes: a receiving section that receives information on a UL/DL configuration in a second carrier; and a control section that determines start timing of the UL/DL configuration in the second carrier based on an offset between a frame boundary in a first carrier and a frame boundary in the second carrier.

Advantageous Effects of Invention

According to the aspect of the present disclosure, the decrease of the communication throughput can be suppressed even when the plurality of RATs coexist.

BRIEF DESCRIPTION OF DRAWINGS

FIG. 1 is a diagram illustrating a TDD UL/DL configuration of LTE.

FIGS. 4A to 4C are diagrams illustrating an example of a correspondence relationship between the frame boundary offset and the TDD UL/DL configuration of LTE according to the embodiment.

FIGS. 5A and 5B are diagrams illustrating another example of the correspondence relationship between the frame boundary offset and the TDD UL/DL configuration of LTE according to the embodiment.

DESCRIPTION OF EMBODIMENTS

When NR and LTE coexist, a situation is conceived where a band of NR (use band) is the same as, overlaps, or is adjacent to a band of LTE (for example, the band of LTE is B42, and the band of NR is n77/78). In this case, if a Time Division Duplex (TDD) band is used in the band of LTE, then it is desirable that an NR UL/DL configuration (UL-DL Configuration) be operated so as to be synchronized with a UL/DL configuration of LTE. This is because UL-DL interference or the like will occur if the UL-DL configurations of NR and LTE are not synchronized with each other.

FIG. 1 is a diagram illustrating a TDD UL/DL configuration of LTE. UL/DL configurations for use in TDD of the existing LTE system (for example, LTE Rel. 14 or earlier) are UL/DL configurations 0 to 6 illustrated in FIG. 1. "D" indicates a DL subframe, "U" indicates a UL subframe, and "S" indicates a special subframe. In the special subframe, switching from DL to UL may be performed.

Figure 2:
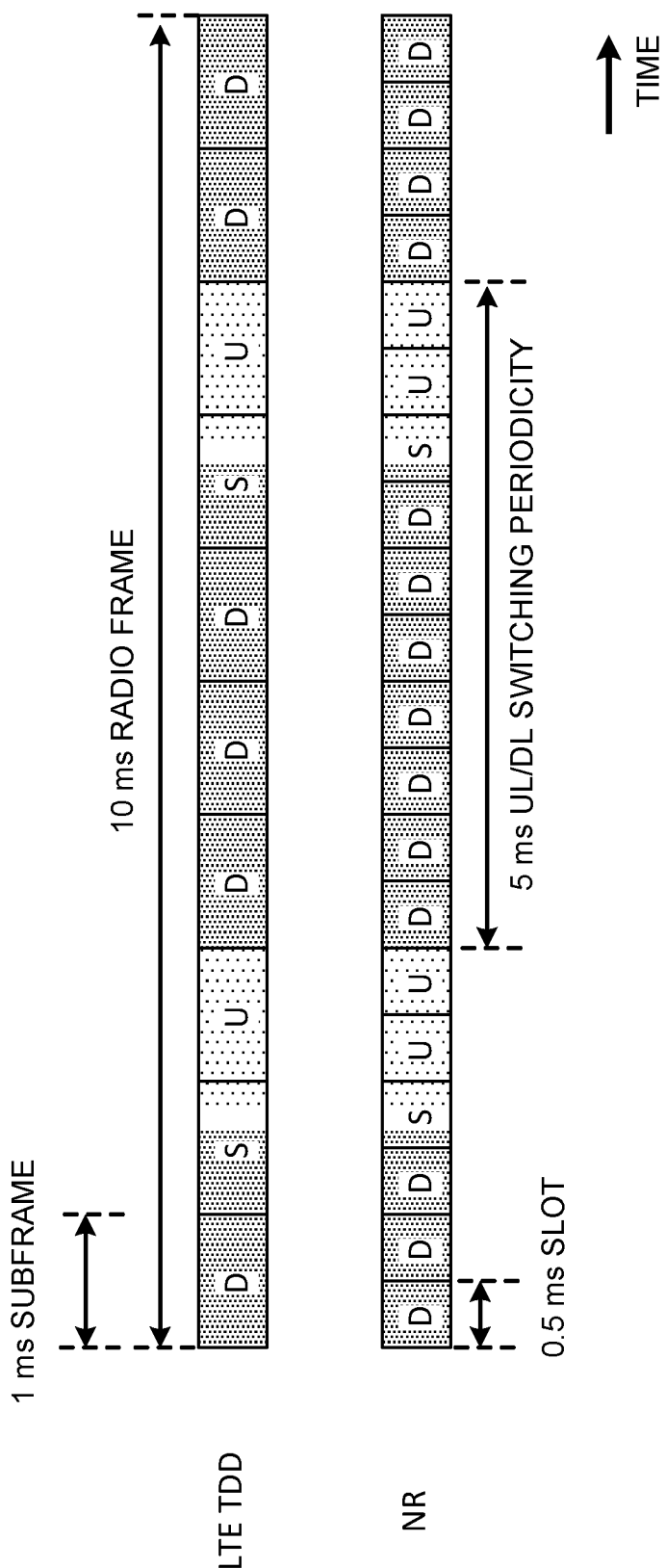
FIG. 2 is a diagram illustrating an example of a UL/DL configuration when LTE and NR coexist.

FIG. 2 is a diagram illustrating an example of a UL/DL configuration when LTE and NR coexist. In FIG. 2, the UL/DL configuration of LTE corresponds to UL/DL configuration 2 that is often used. In FIG. 2, the band of NR is assumed to be a frequency band lower than 6 GHz (sub-6) (may be called FR (Frequency Range) 1), but is not limited to this. The band of NR may be a frequency band higher than 6 GHz (above-6), a frequency band higher than 24 GHz (above-24) (may be called FR2), or the like.

In FIG. 2, slots of NR are 0.5 ms, and are set in a user terminal (UE: User Equipment) so that UL and DL are individually performed in a UL/DL switching periodicity of 5 ms (=10 slots) at the same timing as LTE.

In NR, upper layer signaling (RRC signaling) related to the TDD UL/DL configuration includes (cell-specific) common UL/DL configuration information (TDD-UL-DL-ConfigCommon information element) common to plural pieces of UE, UE-specific UL/DL configuration information (TDD-UL-DL-ConfigDedicated information element), and the like.

The common UL/DL configuration information may include a reference subcarrier spacing (referenceSubcarrierSpacing), a DL-UL transmission cycle (dl-UL-TransmissionPeriodicity), the number of DL slots (nrofDownlinkSlots), the number of DL symbols (nrofDownlinkSymbols), the number of UL slots (nrofUplinkSlots), the number of UL symbols (nrofUplinkSymbols), and the like.

Here, the reference subcarrier spacing is used to determine a time domain boundary of a DL-UL pattern, which does not depend on a subcarrier spacing actually used for data transmission. The DL-UL transmission periodicity is a periodicity of the DL-UL pattern. The number of DL slots indicates the number of complete DL slots consecutive from the beginning of the pattern, and the number of DL symbols indicates the number of DL symbols consecutive from the beginning of a slot after the last complete DL slot. The number of UL slots indicates the number of complete UL slots consecutive at the end of the pattern, and the number of UL symbols indicates the number of UL symbols consecutive at the end of a slot before the first complete UL slot.

Further, UE-specific UL/DL configuration information may include slot configuration information (TDD-UL-DL-SlotConfig information element) regarding any slot in a given period (for example, 10 ms), and the slot configuration information may include information that specifies a transmission direction (for example, UL, DL, and the like) in the unit of symbol within a certain slot. Contents of the common UL/DL configuration information may be overwritten by the UE-specific UL/DL configuration information.

As can be understood from the above, the DL-UL pattern specified by the common UL/DL configuration information is a pattern that starts at one consecutive DL portion (DL portion specified by the number of DL symbols and the number of DL slots, which are mentioned above) and ends at one consecutive UL portion (UL portion specified by the number of UL symbols and the number of UL slots, which are mentioned above). It is also under study to couple two DL-UL patterns using two pieces of common UL/DL configuration information.

Assuming that frame boundaries in LTE and NR are the same, for example, in the example of FIG. 2, the beginnings of the first (leftmost) DL subframes/slots are the frame boundaries. However, such DL-UL patterns cannot be specified in the common UL/DL configuration information of NR. Further, overwriting using the UE-specific UL/DL configuration information has a problem that a communication overhead increases to decrease the communication throughput and the like.

Therefore, the inventors of the present invention have conceived a radio communication method for suppressing the decrease of the communication throughput even when a plurality of RATs coexist.

Hereinafter, embodiments according to the present disclosure will be described in detail with reference to the drawings. The radio communication method according to each of the embodiments may be applied independently, or may be applied in combination with others.

The following description will be given on the assumption that the first carrier is a carrier for LTE (band for LTE) and that the second carrier is a carrier for NR (band for NR). LTE, NR, the first carrier, the second carrier, a carrier for a first RAT, a carrier for a second RAT, and the like in the present disclosure may be replaced by one another. The first RAT and the second RAT may be the same.

(Radio Communication Method)

In one embodiment, UE may determine (specify) that a frame boundary of the second carrier is at a position shifted by an offset from a frame boundary of the first carrier. Hereinafter, the offset of the frame boundary is also simply referred to as "offset". The offset may be called a difference, a time offset, a subframe offset, a slot offset, or the like.

Figure 3:
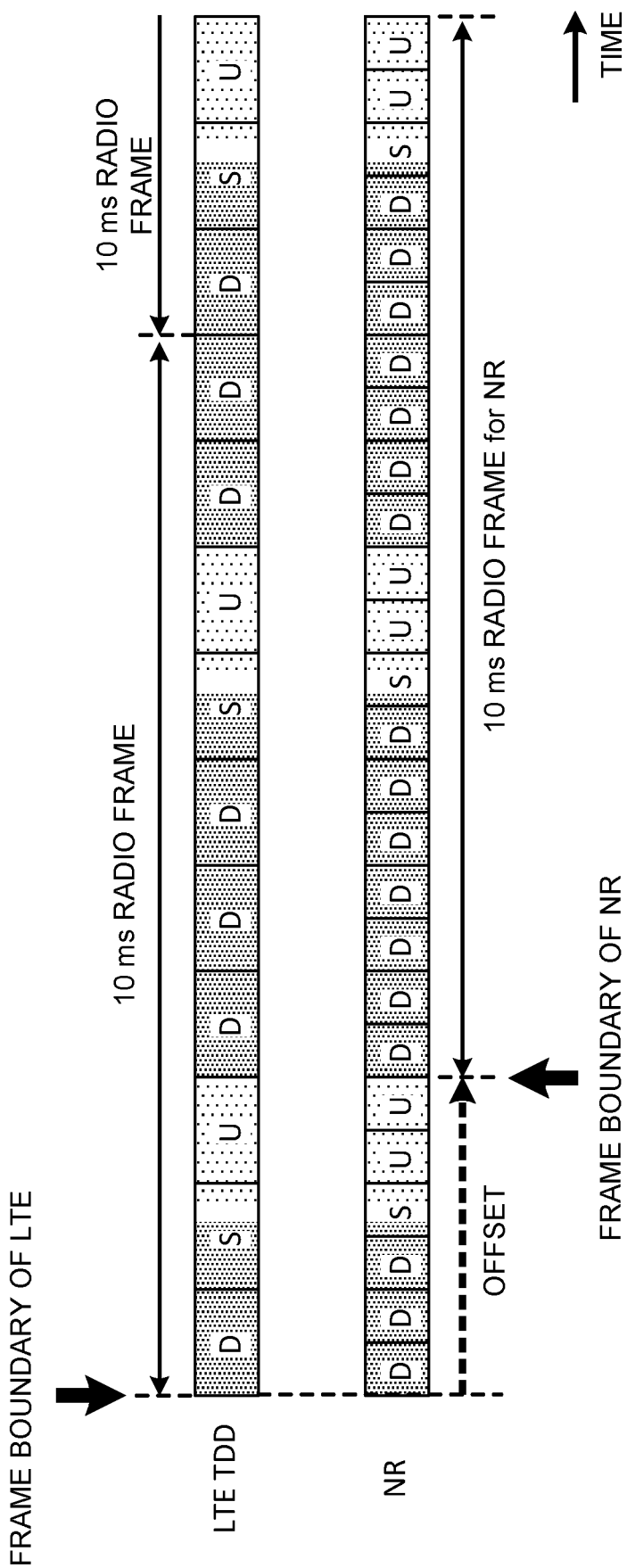
FIG. 3 is a diagram illustrating an example of a frame boundary offset according to an embodiment.

FIG. 3 is a diagram illustrating an example of a frame boundary offset according to the embodiment. In this example, as in FIG. 2, the UL/DL configuration of LTE is UL/DL configuration 2, and the UL/DL configuration of NR is set to have the same transmission direction as that of LTE.

In this example, it is assumed that UE may grasp that the frame boundary of NR is shifted by 3 ms from the frame boundary of LTE, and that a radio frame for NR starts from the frame boundary of NR.

UE may be notified (set) of offset information from the base station using, for example, upper layer signaling, physical layer signaling, or a combination thereof.

Here, the upper layer signaling may be, for example, any of RRC (Radio Resource Control) signaling, MAC (Medium Access Control) signaling, broadcast information, and the like, or a combination thereof.

For the MAC signaling, for example, a MAC control element (MAC CE (Control Element)), a MAC PDU (Protocol Data Unit), or the like may be used. The broadcast information includes, for example, a master information block (MIB), a system information block (SIB), and remaining minimum system information (RMSI). The broadcast information may be OSI (Other System Information).

The offset information may include information on an offset in a specific unit of time. For example, the offset information may indicate an offset value in a unit of seconds (for example, units of milliseconds). The offset information may indicate an offset value in a unit of subframe. The offset information may indicate an offset value in a unit of slot used in at least one of the first carrier and the second carrier.

The offset information may be included in information regarding measurement (for example, "MeasObjectNR" information element). The measurement may be a same frequency measurement or a different frequency measurement. The offset information may be reported together with at least one of information as to whether the carrier to be measured is synchronized, information as to whether the carrier to be measured is synchronized with a serving cell (whether an index of a synchronization signal block transmitted by an adjacent cell (or neighbor cell) (or neighboring cell) can be derived based on timing the serving cell) (this information may be called a parameter "useServingCellTimingForSync"), and the like.

The offset information may be included in a handover command (for example, inter-RAT handover command).

UE may derive (determine) the offset based on a given condition. For example, UE is communicating using a TDD serving cell of LTE, and when the implementation of the measurement of the TDD carrier of NR (for example, FR1 carrier) is set, UE may derive the offset based on a TDD UL/DL configuration used in the above-described TDD serving cell of LTE.

FIGS. 4A to 4C are diagrams illustrating an example of a correspondence relationship between a frame boundary offset and a TDD UL/DL configuration of LTE according to the embodiment, and FIGS. 5A and 5B are diagrams illustrating another example of the correspondence relationship between the frame boundary offset and the TDD UL/DL configuration of LTE according to the embodiment.

In these examples, UE determines that start timing of a longest consecutive DL portion (DL symbols of a DL subframe and an S subframe) when it is assumed that the same TDD UL/DL configuration is used in consecutive radio frames is the frame boundary of NR (that is, UE derives an offset at which the start timing becomes the frame boundary of NR).

As illustrated in FIG. 4A, UE may determine that the offset is 0 ms (none) when an LTE TDD UL/DL configuration #0 is used (for example, set) in the serving cell. UE may determine that the offset is 5 ms when an LTE TDD UL/DL configuration #1 is used in the serving cell.

As illustrated in FIG. 4B, UE may determine that the offset is 4 ms when the LTE TDD UL/DL configuration #1 or #4 is used in the serving cell. UE may determine that the offset is 9 ms when the LTE TDD UL/DL configuration #1 is used in the serving cell.

As illustrated in FIG. 4C, UE may determine that the offset is 3 ms when the LTE TDD UL/DL configuration #2 or #5 is used in the serving cell. UE may determine that the offset is 8 ms when an LTE TDD UL/DL configuration #2 is used in the serving cell.

As illustrated in FIG. 5A, UE may determine that the offset is 5 ms when an LTE TDD UL/DL configuration #3 is used in the serving cell.

As illustrated in FIG. 5B, UE may determine that the offset is 9 ms when an LTE TDD UL/DL configuration #6 is used in the serving cell. UE may determine that the offset is 5 ms when the LTE TDD UL/DL configuration #6 is used in the serving cell.

The correspondence relationship between the frame boundary offset and the TDD UL/DL configuration of LTE may be defined by the specifications, or may be set in UE by the upper layer signaling or the like.

UE may derive the offset based on a set SFTD (SFN and Frame Timing Difference) measurement. When being notified that SFTD is set and that the serving cell and a measurement target cell (target cell) are synchronized with each other, UE may determine that a frame boundary of the measurement target cell is located a position shifted by the offset from the frame boundary of the serving cell. Whether or not a plurality of cells are synchronized with one another may be determined by, for example, the parameter "useServingCellTimingForSync".

According to the embodiment described above, even when NR and LTE coexist, transmission/reception can be performed by appropriately considering such a shift of the frame boundary between RATS. Thus, for example, for the inter-RAT measurement, UE may determine synchronization (synchronization of frame timing, SFN or the like) based on useServingCellTimingForSync, and can determine a RACH (Random Access Channel) period without reading a broadcast channel (PBCH: Physical Broadcast Channel) in the inter-RAT handover.

The offset in the above-mentioned embodiment may be replaced by an offset of SFN of the second carrier from a system frame number (SFN) of the first carrier. UE may determine a start position of a DL-UL pattern on the second carrier using one or both of the frame boundary offset and the SFN offset.

In the present disclosure, the frequency range, the cell, the serving cell, the carrier, the band, and the CC may be replaced by one another.

(Radio Communication System)

Now, a configuration of a radio communication system according to the embodiment of the present disclosure will be described below. In this radio communication system, communication is performed using one or a combination of the radio communication methods according to the above embodiments of the present disclosure.

Figure 6:
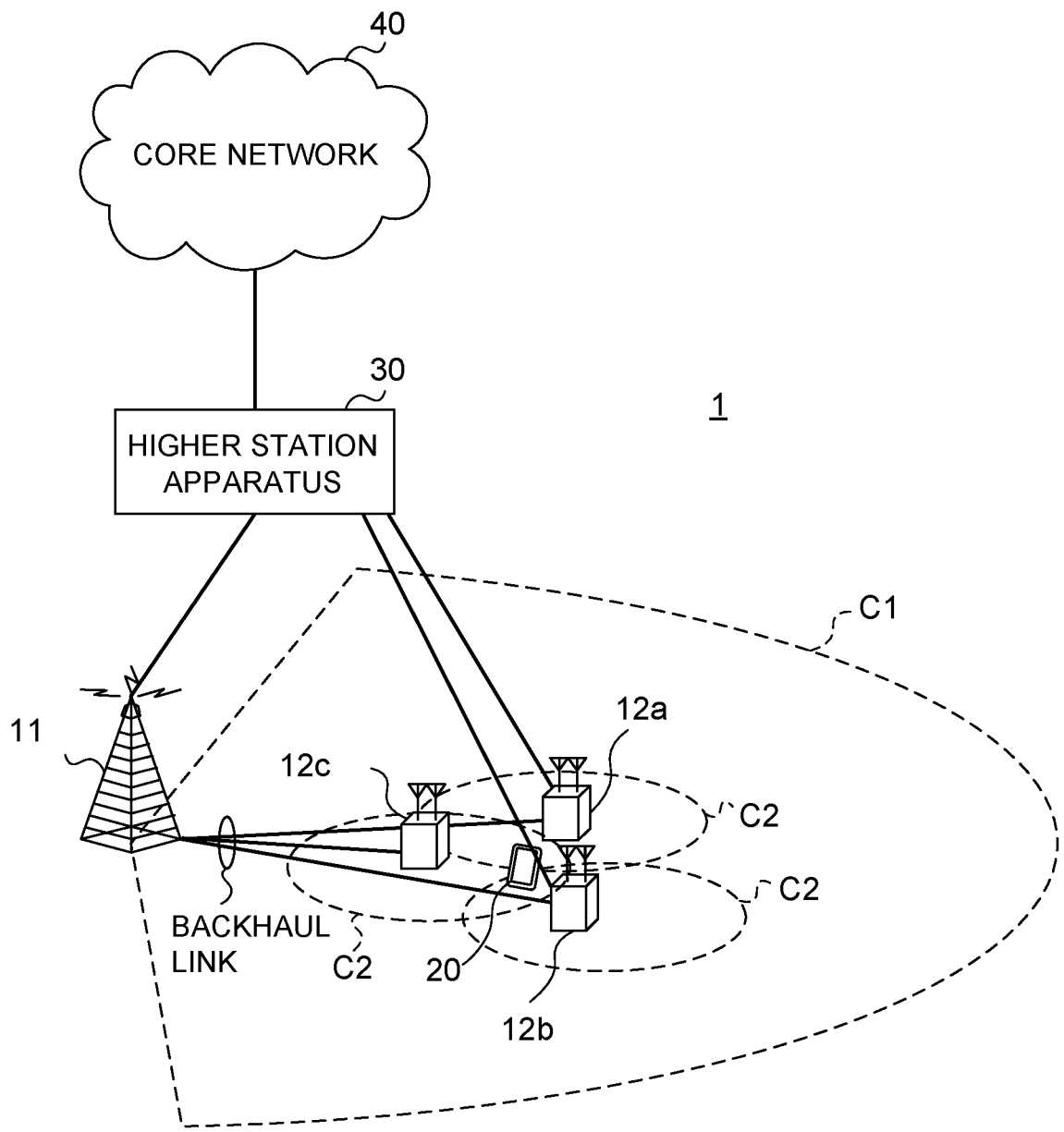
FIG. 6 is a diagram illustrating an example of a schematic configuration of a radio communication system according to the embodiment.

FIG. 6 is a diagram illustrating an example of a schematic configuration of a radio communication system according to the embodiment. A radio communication system 1 can adopt dual connectivity (DC) and/or carrier aggregation (CA) in which a plurality of fundamental frequency blocks (component carriers) each having, as one unit, a system bandwidth (for example, 20 MHz) of an LTE system are integrated with one another.

The radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), NR (New Radio), FRA (Future Radio Access), New-RAT (Radio Access Technology), and the like, or may be called a system that achieves these.

The radio communication system 1 includes: a radio base station 11 that forms a macro cell C1 having a relatively wide coverage; and radio base stations 12 (12a to 12c) which are placed within the macro cell C1 and form small cells C2 narrower than the macro cell C1. Further, user terminals 20 are placed in the macro cell C1 and the respective small cells C2. The arrangement, number, and the like of the respective cells and the user terminal 20 are not limited to those illustrated in the drawings.

The user terminal 20 can connect to both the radio base station 11 and the radio base stations 12. It is assumed that the user terminal 20 uses the macro cell C1 and the small cells C2 simultaneously by means of CA or DC. Moreover, the user terminal 20 can apply CA or DC using a plurality of cells (CCs).

Between the user terminal 20 and the radio base station 11, communication can be carried out using a carrier with a narrow bandwidth in a relatively low frequency band (for example, 2 GHz) (this carrier is also called an existing carrier, a legacy carrier, and the like). Meanwhile, between the user terminal 20 and the radio base stations 12, a carrier with a wide bandwidth in a relatively high frequency band (for example, 3.5 GHz, 5 GHz, and the like) may be used, or the same carrier as that for use between the radio base station 11 and the user terminal 20 may be used. The configuration of the frequency band for use in each radio base station is by no means limited to these.

Moreover, the user terminal 20 can perform communication in each cell using time division duplex (TDD) and/or frequency division duplex (FDD). Further, in each cell (carrier), a single numerology may be applied, or a plurality of different numerologies may be applied.

The numerology may be a communication parameter applied to transmission and/or reception of a signal and/or channel. For example, the numerology may indicate at least one of a subcarrier spacing, a bandwidth, a symbol length, a cyclic prefix length, a subframe length, a TTI length, the number of symbols per TTI, a radio frame configuration, specific filtering processing to be performed by a transceiver in the frequency domain, specific windowing processing to be performed by the transceiver in the time domain, and the like. It may be mentioned that the numerology is different when, for a certain physical channel for example, a subcarrier spacing of OFDM symbols which constitute the physical channel is different and/or the number of OFDM symbols is different.

The radio base station 11 and the radio base stations 12 may be (or two radio base stations 12 may be) connected to each other by wired connection (for example, optical fiber, X2 interface, and the like in compliance with the CPRI (Common Public Radio Interface) or wireless connection.

The radio base station 11 and the radio base stations 12 are each connected to a higher station apparatus 30, and are connected to a core network 40 via the higher station apparatus 30. The higher station apparatus 30 includes, for example, an access gateway apparatus, a radio network controller (RNC), a mobility management entity (MME), and the like, but is by no means limited to these. Further, each radio base station 12 may be connected to the higher station apparatus 30 via the radio base station 11.

The radio base station 11 is a radio base station having a relatively wide coverage, and may be called a macro base station, a central node, eNB (eNodeB), a transmitting/receiving point (TRP), and the like. Further, each of the radio base stations 12 is a radio base station having a local coverage, and may be called a small base station, a micro base station, a pico base station, a femto base station, HeNBs (Home eNodeBs), RRHs (Remote Radio Heads), a transmitting/receiving point, and the like. Hereinafter, the radio base stations 11 and 12 will be collectively referred to as radio base stations 10 unless these are distinguished from each other.

Each user terminal 20 is a terminal that supports various communication methods such as LTE and LTE-A, and may include not only a mobile communication terminal (mobile station) but also a stationary communication terminal (fixed station).

In the radio communication system 1, as a radio access method, orthogonal frequency division multiple access (OFDMA) is applied to the downlink, and single carrier frequency division multiple access (SC-FDMA) and/or OFDMA are applied to the uplink.

OFDMA is a multi-carrier communication method of performing communication by dividing a frequency band into a plurality of narrow frequency bands (subcarriers) and mapping data to the respective subcarriers. SC-FDMA is a single-carrier communication method of reducing an interference between terminals by dividing, for each of terminals, a system bandwidth into bands composed of one or continuous resource blocks, and causing a plurality of terminals to use mutually different bands. The uplink and downlink radio access methods are not limited to combinations of these, and other radio access methods may be used.

In the radio communication system 1, as downlink channels, there are used a downlink shared channel (PDSCH (Physical Downlink Shared Channel), which is shared by the respective user terminals 20, a broadcast channel (PBCH (Physical Broadcast Channel)), downlink L1/L2 control channels, and the like. User data, upper layer control information, and SIBs (System Information Blocks) are transmitted by PDSCH. Further, MIB (Master Information Block) is transmitted by PBCH.

The downlink L1/L2 control channels include PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel), and the like. Downlink control information (DCI) including scheduling information of PDSCH and/or PUSCH, or the like is transmitted by PDCCH.

DCI that schedules receipt of DL data may be called DL assignment, and DCI that schedules transmission of UL data may be called UL grant.

The number of OFDM symbols for use in PDCCH is transmitted by PCFICH. HARQ (Hybrid Automatic Repeat reQuest) delivery confirmation information (also referred to as, for example, "retransmission control information", "HARQ-ACKs", "ACK/NACKs", and the like) in response to PUSCH is transmitted by PHICH. EPDCCH is frequency-division-multiplexed with PDSCH (downlink shared data channel), and like PDCCH, is used for transmitting DCI and the like.

In the radio communication system 1, as uplink channels, used are an uplink shared channel (PUSCH: Physical Uplink Shared Channel), which is shared by the respective user terminals 20, an uplink control channel (PUCCH: Physical Uplink Control Channel), a random access channel (PRACH: Physical Random Access Channel), and the like. User data, upper layer control information, and the like are transmitted by PUSCH. Further, by PUCCH, downlink radio quality information (CQI (Channel Quality Indicator)), delivery confirmation information, scheduling requests (SRs), and the like are transmitted. By means of PRACH, random access preambles for establishing connections with cells are transmitted.

In the radio communication systems 1, a cell-specific reference signal (CRS), a channel state information reference signal (CSI-RS), a demodulation reference signal (DMRS), a positioning reference signal (PRS), and the like are transmitted as downlink reference signals. Further, in the radio communication system 1, a measurement reference signal (SRS (Sounding Reference Signal)), a demodulation reference signal (DMRS), and the like are transmitted as uplink reference signals. DMRS may be called a user terminal-specific reference signal (UE-specific Reference Signal). Further, the reference signals to be transmitted are by no means limited to these.

<Radio Base Station>

Figure 7:
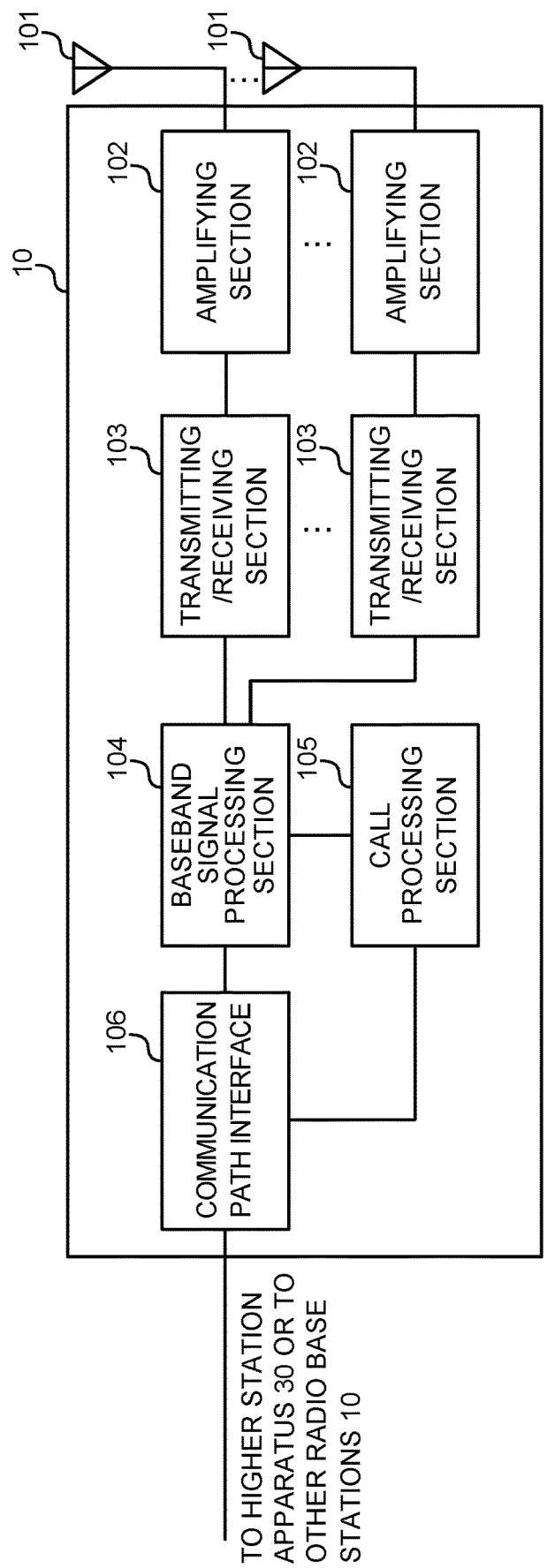
FIG. 7 is a diagram illustrating an example of an overall configuration of a radio base station according to the embodiment.

FIG. 7 is a diagram illustrating an example of an overall configuration of a radio base station according to the embodiment. A radio base station 10 includes a plurality of transmitting/receiving antennas 101, amplifying sections 102, transmitting/receiving sections 103, a baseband signal processing section 104, a call processing section 105, and a communication path interface 106. Each of the transmitting/receiving antennas 101, the amplifying sections 102, and the transmitting/receiving sections 103 may be composed to include one or more thereof.

User data to be transmitted from the radio base station 10 to the user terminal 20 by the downlink is input from the higher station apparatus 30 to the baseband signal processing section 104 via the communication path interface 106.

In the baseband signal processing section 104, the user data is subjected to transmission processing, including processing of a PDCP (Packet Data Convergence Protocol) layer, division and coupling of the user data, RLC (Radio Link Control) layer transmission processing such as RLC retransmission control, MAC (Medium Access Control) retransmission control (for example, HARQ transmission processing), scheduling, transmission format selection, channel coding, inverse fast Fourier transform (IFFT) processing, and precoding processing, and a result is transferred to each transmitting/receiving section 103. Furthermore, downlink control signals are also subjected to transmission processing such as channel coding and inverse fast Fourier transform, and are transferred to the transmitting/receiving sections 103.

Each of the transmitting/receiving sections 103 converts a baseband signal, which is pre-coded for each antenna and output from the baseband signal processing section 104, into a signal in a radio frequency band, and transmits such a radio frequency signal. A radio frequency signal subjected to the frequency conversion in each transmitting/receiving section 103 is amplified in the amplifying section 102, and transmitted from each transmitting/receiving antenna 101. The transmitting/receiving section 103 can be composed of a transmitter/receiver, a transmitting/receiving circuit, or a transmitting/receiving apparatus, which is described based on common understanding in the technical field according to the present disclosure. The transmitting/receiving section 103 may be composed of an integrated transmitting/receiving section, or may be composed of a transmitting section and a receiving section.

Meanwhile, as for each uplink signal, a radio frequency signal received by the transmitting/receiving antenna 101 is amplified by the amplifying section 102. Each transmitting/receiving section 103 receives the uplink signal amplified by the amplifying section 102. The transmitting/receiving section 103 performs frequency conversion for the received signal into the baseband signal, and outputs the baseband signal to the baseband signal processing section 104.

In the baseband signal processing section 104, user data included in the input uplink signal is subjected to fast Fourier transform (FFT) processing, inverse discrete Fourier transform (IDFT) processing, error correction decoding, receiving processing for MAC retransmission control, and receiving processing for an RLC layer and a PDCP layer, and the uplink data is transferred to the higher station apparatus 30 via the communication path interface 106. The call processing section 105 performs call processing (such as setting and releasing) for communication channels, manages states of the radio base stations 10, manages the radio resources, and so on.

The communication path interface 106 transmits and receives signals to and from the higher station apparatus 30 via a given interface. Moreover, the communication path interface 106 may transmit and receive (perform backhaul signaling for) signals with other radio base stations 10 via an inter-base station interface (for example, optical fiber in compliance with CPRI (Common Public Radio Interface), and the X2 interface).

The transmitting/receiving section 103 may further include an analog beam forming unit that implements analog beamforming. The analog beam forming unit may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 101 may be composed of an array antenna, for example.

Figure 8:
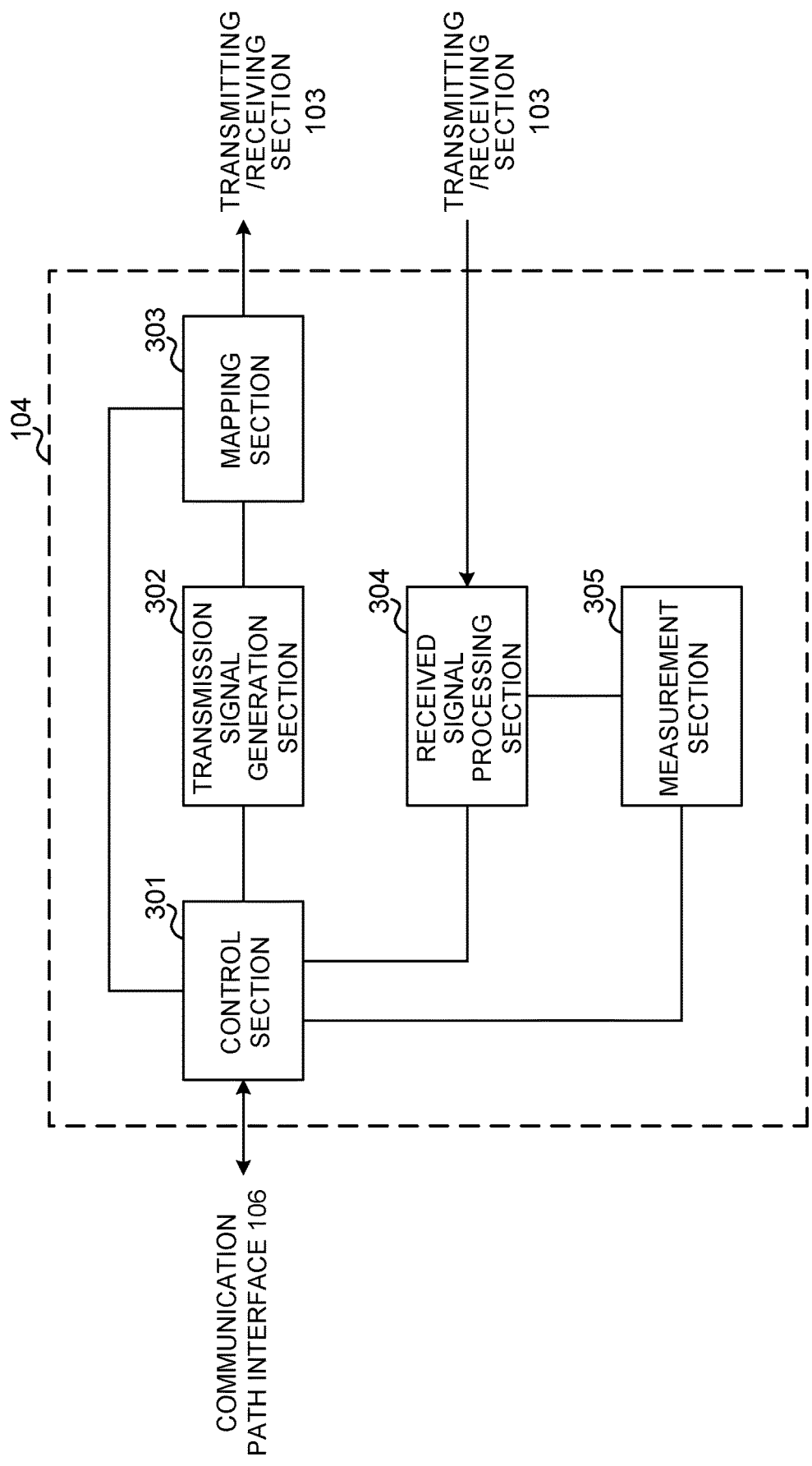
FIG. 8 is a diagram illustrating an example of a functional configuration of the radio base station according to the embodiment.

FIG. 8 is a diagram illustrating an example of a functional configuration of the radio base station according to the embodiment. This example mainly illustrates functional blocks of characteristic portions in the present embodiment, and it may be assumed that the radio base station 10 has other functional blocks necessary for radio communication as well.

The baseband signal processing section 104 includes at least a control section (scheduler) 301, a transmission signal generation section 302, a mapping section 303, a received signal processing section 304, and a measurement section 305. These configurations just need to be included in the radio base station 10, and some or all of the configurations need not be included in the baseband signal processing section 104.

The control section (scheduler) 301 controls the whole of the radio base station 10. The control section 301 can be composed of a controller, a control circuit, or control apparatus, which is described based on common understanding in the technical field according to the present disclosure.

For example, the control section 301 controls the generation of signals in the transmission signal generation section 302, the allocation of signals in the mapping section 303, and the like. Moreover, the control section 301 controls the receiving processing for signals in the received signal processing section 304, measurement of signals in the measurement section 305, and the like.

The control section 301 controls scheduling (for example, resource allocation) of system information, downlink data signals (for example, signals transmitted in PDSCH), and downlink control signals (for example, signals transmitted in PDCCH and/or EPDCCH, such as delivery confirmation information). The control section 301 controls the generation of downlink control signals, downlink data signals, and the like based on results of determining whether or not retransmission control is necessary for uplink data signals, and the like.

The control section 301 controls scheduling of synchronization signals (for example, PSS (Primary Synchronization Signal)/SSS (Secondary Synchronization Signal)), downlink reference signals (for example, CRS, CSI-RS, DMRS), and the like.

The control section 301 controls scheduling of uplink data signals (for example, signals transmitted in PUSCH), uplink control signals (for example, signals transmitted in PUCCH and/or PUSCH, such as delivery confirmation information), random access preambles (for example, signals transmitted in PRACH), uplink reference signals, and the like.

The control section 301 may perform control to form a transmission beam and/or a reception beam using a digital BF (for example, precoding) in the baseband signal processing section 104 and/or an analog BF (for example, phase rotation) in the transmitting/receiving section 103. The control section 301 may perform control to form the beams based on downlink propagation path information, uplink propagation path information, and the like. These pieces of propagation path information may be acquired from the received signal processing section 304 and/or the measurement section 305.

The transmission signal generation section 302 generates the downlink signals (downlink control signals, downlink data signals, downlink reference signals, and the like) based on an instruction from the control section 301, and outputs the generated downlink signals to the mapping section 303. The transmission signal generation section 302 can be composed of a signal generator, a signal generating circuit, or a signal generating apparatus, which is described based on common understanding in the technical field according to the present disclosure.

For example, the transmission signal generation section 302 generates DL assignments, which report downlink data allocation information, and/or UL grants, which report uplink data allocation information, based on the instruction from the control section 301. DL assignments and UL grants are both DCI, and follow the DCI format. Further, the downlink data signals are subjected to coding processing and modulation processing in accordance with a coding rate and a modulation scheme, which are determined based on channel state information (CSI) reported from each user terminal 20.

The mapping section 303 maps the downlink signals, which are generated in the transmission signal generation section 302, to given radio resources based on instructions from the control section 301, and outputs the mapped downlink signals to the transmitting/receiving sections 103. The mapping section 303 can be composed of a mapper, a mapping circuit, or a mapping apparatus, which is described based on common understanding in the technical field according to the present disclosure.

The received signal processing section 304 performs receiving processing (for example, demapping, demodulation, decoding, and the like) for received signals input from the transmitting/receiving sections 103. Here, the received signals are, for example, uplink signals (uplink control signals, uplink data signals, uplink reference signals, and the like) transmitted from the user terminals 20. The received signal processing section 304 can be composed of a signal processor, a signal processing circuit, or a signal processing apparatus, which is described based on common understanding in the technical field according to the present disclosure.

The received signal processing section 304 outputs, to the control section 301, information decoded by the receiving processing. For example, when receiving PUCCH including HARQ-ACK, the received signal processing section 304 outputs HARQ-ACK to the control section 301. Further, the received signal processing section 304 outputs the received signals and/or the signals already subjected to the receiving processing to the measurement section 305.

The measurement section 305 conducts measurements for the received signals. The measurement section 305 can be composed of a measurer, a measurement circuit, or a measurement apparatus, which is described based on common understanding in the technical field according to the present disclosure.

For example, the measurement section 305 may perform RRM (Radio Resource Management) measurement, CSI (Channel State Information) measurement, and the like based on the received signals. The measurement section 305 may measure received power (for example, RSRP (Reference Signal Received Power)), received quality (for example, RSRQ (Reference Signal Received Quality), SINR (Signal to Interference plus Noise Ratio), SNR (Signal to Noise Ratio)), a signal strength (for example, RSSI (Received Signal Strength Indicator)), propagation path information (for example, CSI), and the like. Results of the measurement may be output to the control section 301.

The transmitting/receiving section 103 may transmit information on the UL/DL configuration (that is, TDD-UL-DL-ConfigCommon information element, TDD-UL-DL-ConfigDedicated information element and the like) in the second carrier (for example, NR carrier).

The control section 301 may perform control to transmit, to the user terminal 20, information regarding the offset between the frame boundary in the first carrier and the frame boundary in the second carrier.

(User Terminal)

Figure 9:
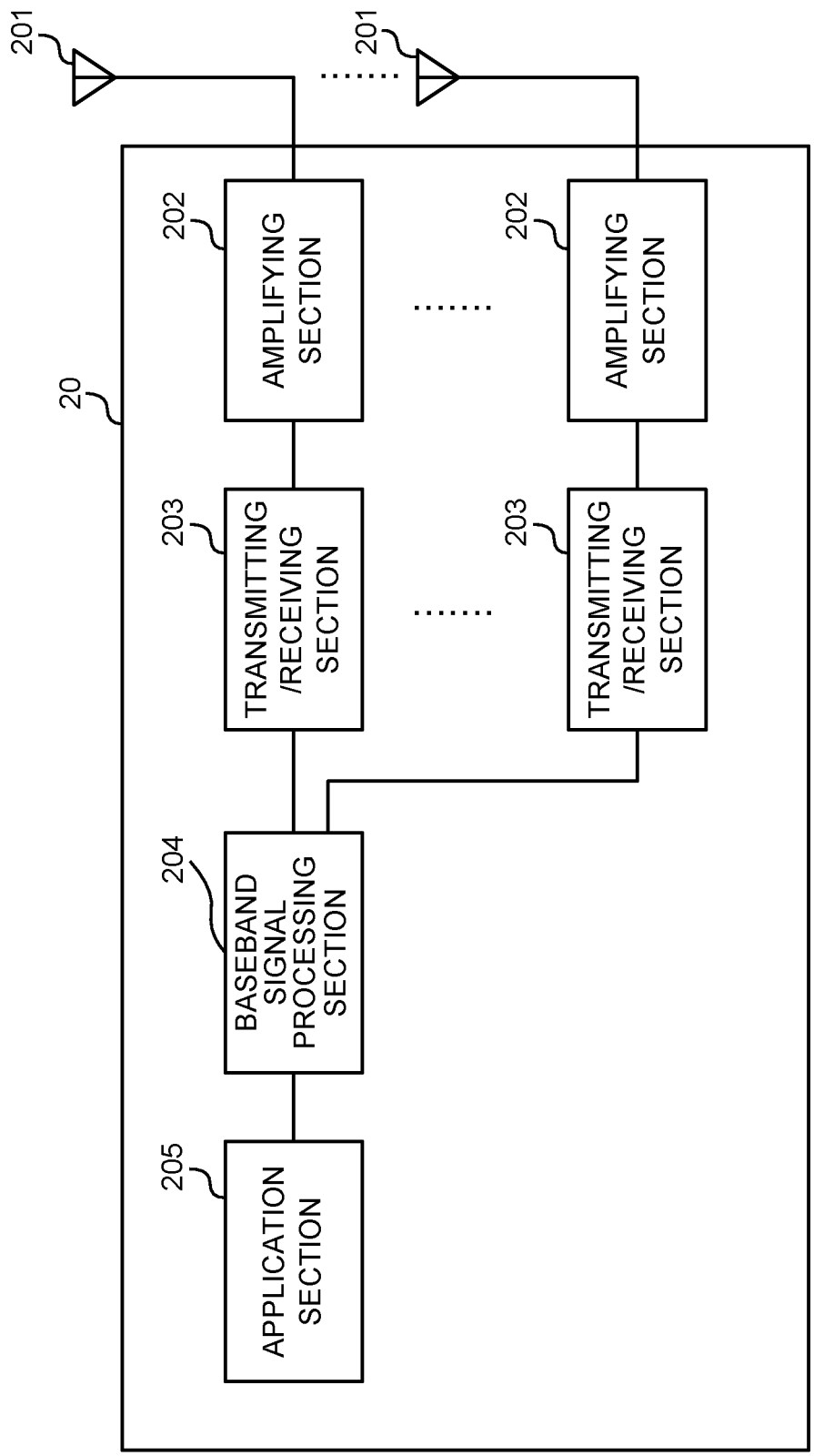
FIG. 9 is a diagram illustrating an example of an overall configuration of a user terminal according to the embodiment.

FIG. 9 is a diagram illustrating an example of an overall configuration of the user terminal according to the embodiment. The user terminal 20 includes a plurality of transmitting/receiving antennas 201, amplifying sections 202, transmitting/receiving sections 203, a baseband signal processing section 204, and an application section 205. Each of the transmitting/receiving antennas 201, the amplifying sections 202, and the transmitting/receiving sections 203 may be composed to include one or more thereof.

Radio frequency signals received in the transmitting/receiving antennas 201 are amplified in the amplifying sections 202. Each transmitting/receiving section 203 receives the downlink signal amplified by the amplifying section 202. The transmitting/receiving sections 203 perform frequency conversion for the received signals into baseband signals, and output the baseband signals to the baseband signal processing section 204. The transmitting/receiving section 203 can be composed of a transmitter/receiver, a transmitting/receiving circuit, or a transmitting/receiving apparatus, which is described based on common understanding in the technical field according to the present disclosure. The transmitting/receiving section 203 may be composed of an integrated transmitting/receiving section, or may be composed of a transmitting section and a receiving section.

The baseband signal processing section 204 performs FFT processing, error correction decoding, retransmission control receiving processing, and the like for the input baseband signals. Downlink user data is transferred to the application section 205. The application section 205 performs processing related to upper layers than a physical layer and a MAC layer, and the like. Further, in the downlink data, broadcast information may also be transferred to the application section 205.

Meanwhile, the uplink user data is input from the application section 205 to the baseband signal processing section 204. In the baseband signal processing section 204, transmission processing (for example, transmission processing for HARQ) for the retransmission control, channel coding, precoding, discrete Fourier transform (DFT) processing, IFFT processing, and the like are performed for the uplink user data, and the uplink user data is transferred to each of the transmitting/receiving sections 203.

Each of the transmitting/receiving sections 203 converts the baseband signal, which is output from the baseband signal processing section 204, into signal in a radio frequency band, and transmits such a radio frequency signal. A radio frequency signal subjected to the frequency conversion in each transmitting/receiving section 203 is amplified by the amplifying section 202, and transmitted from each transmitting/receiving antenna 201.

The transmitting/receiving section 203 may further include an analog beam forming unit that implements analog beamforming. The analog beam forming unit may be composed of an analog beam forming circuit (for example, a phase shifter, a phase shift circuit) or an analog beam forming device (for example, a phase shifter), which is described based on common understanding in the technical field according to the present invention. Further, the transmitting/receiving antenna 201 may be composed of an array antenna, for example.

Figure 10:
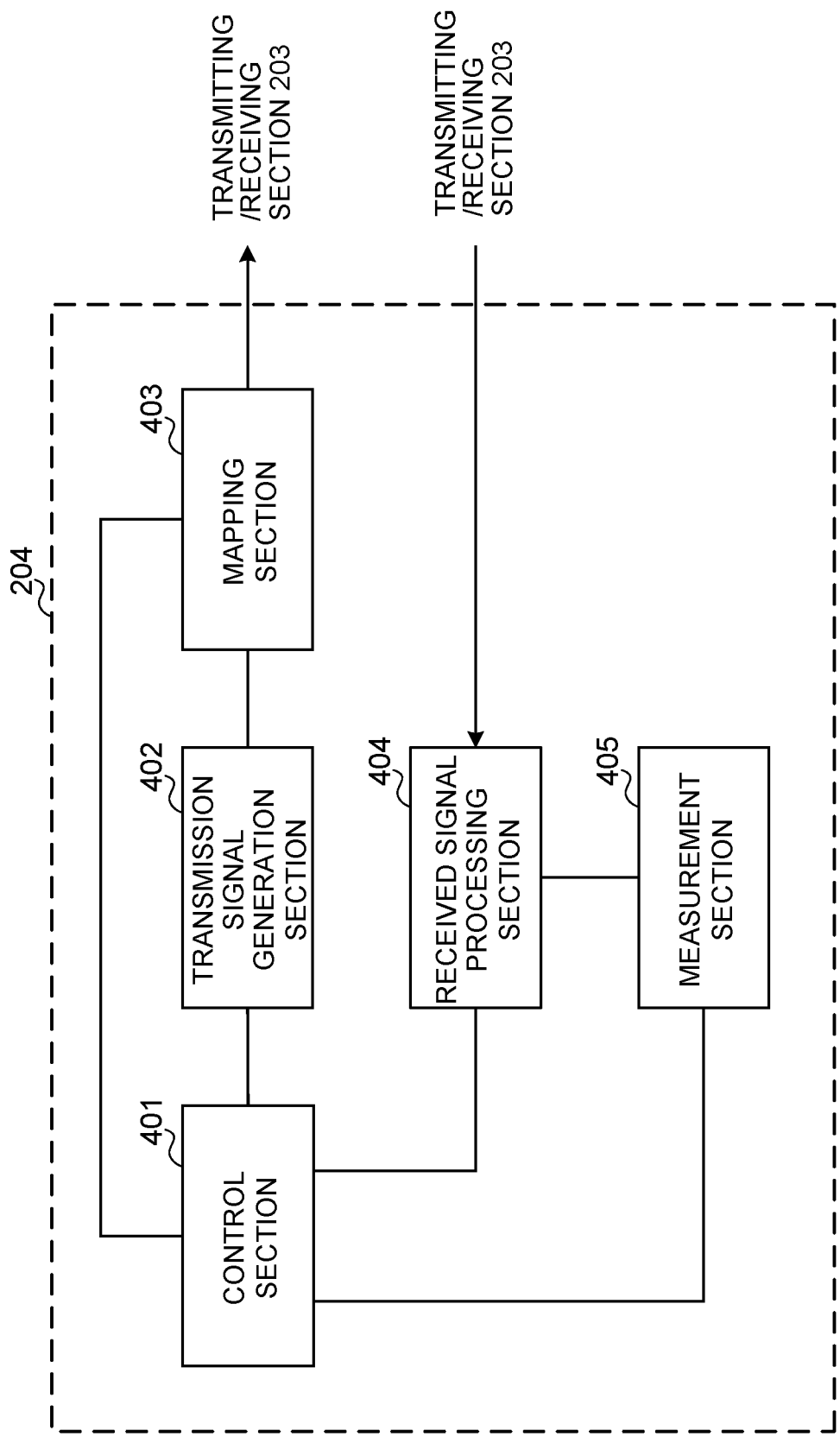
FIG. 10 is a diagram illustrating an example of a functional configuration of the user terminal according to the embodiment.

FIG. 10 is a diagram illustrating an example of a functional configuration of the user terminal according to the embodiment. This example mainly illustrates functional blocks of characteristic portions in the present embodiment, and it may be assumed that the user terminal 20 has other functional blocks necessary for radio communication as well.

The baseband signal processing section 204 provided in the user terminal 20 includes at least a control section 401, a transmission signal generation section 402, a mapping section 403, a received signal processing section 404, and a measurement section 405. These configurations just need to be included in the user terminal 20, and some or all of the configurations need not be included in the baseband signal processing section 204.

The control section 401 controls the whole of the user terminal 20. The control section 401 can be composed of a controller, a control circuit, or control apparatus, which is described based on common understanding in the technical field according to the present disclosure.

For example, the control section 401 controls the generation of signals in the transmission signal generation section 402, the allocation of signals in the mapping section 403, and the like. Moreover, the control section 401 controls the receiving processing for signals in the received signal processing section 404, measurement of signals in the measurement section 405, and the like.

The control section 401 acquires the downlink control signals and downlink data signals, which are transmitted from the radio base station 10, from the received signal processing section 404. The control section 401 controls the generation of uplink control signals and/or uplink data signals based on results of determining whether or not retransmission control is necessary for the downlink control signals and/or the downlink data signals.

The control section 401 may perform control to form a transmission beam and/or a reception beam using a digital BF (for example, precoding) in the baseband signal processing section 204 and/or an analog BF (for example, phase rotation) in the transmitting/receiving section 203. The control section 401 may perform control to form the beams based on downlink propagation path information, uplink propagation path information, and the like. These pieces of propagation path information may be acquired from the received signal processing section 404 and/or the measurement section 405.

Further, when acquiring, from the received signal processing section 404, various information reported from the radio base station 10, the control section 401 may update parameters for use in control based on this information.

The transmission signal generation section 402 generates the uplink signals (uplink control signals, uplink data signals, uplink reference signals, and the like) based on an instruction from the control section 401, and outputs the generated downlink signals to the mapping section 403. The transmission signal generation section 402 can be composed of a signal generator, a signal generating circuit, or a signal generating apparatus, which is described based on common understanding in the technical field according to the present disclosure.

For example, the transmission signal generation section 402 generates an uplink control signal related to delivery confirmation information, channel state information (CSI), and the like based on an instruction from the control section 401. Further, the transmission signal generation section 402 generates uplink data signals based on an instruction from the control section 401. For example, when a UL grant is included in the downlink control signal reported from the radio base station 10, the transmission signal generation section 402 is instructed by the control section 401 to generate an uplink data signal.

The mapping section 403 maps the uplink signals, which are generated in the transmission signal generation section 402, to the radio resources based on instructions from the control section 401, and outputs the mapped uplink signals to the transmitting/receiving sections 203. The mapping section 403 can be composed of a mapper, a mapping circuit, or a mapping apparatus, which is described based on common understanding in the technical field according to the present disclosure.

The received signal processing section 404 performs receiving processing (for example, demapping, demodulation, decoding, and the like) for received signals input from the transmitting/receiving sections 203. Here, the received signals are, for example, downlink signals (downlink control signals, downlink data signals, downlink reference signals, and the like) transmitted from the radio base station 10. The received signal processing section 404 can be composed of a signal processor, a signal processing circuit, or a signal processing apparatus, which is described based on common understanding in the technical field according to the present disclosure. Moreover, the received signal processing section 404 can constitute a receiving section according to the present disclosure.

The received signal processing section 404 outputs, to the control section 401, information decoded by the receiving processing. The received signal processing section 404 outputs, for example, broadcast information, system information, RRC signaling, DCI, and the like to the control section 401. Further, the received signal processing section 404 outputs the received signals and/or the signals already subjected to the receiving processing to the measurement section 405.

The measurement section 405 conducts measurements for the received signals. For example, the measurement section 405 may perform same frequency measurement and/or different frequency measurement for one or both of the first carrier and the second carrier. When the serving cell is included in the first carrier, the measurement section 405 may perform the different frequency measurement in the second carrier based on a measurement instruction acquired from the received signal processing section 404. The measurement section 405 can be composed of a measurer, a measurement circuit, or measurement apparatus, which is described based on common understanding in the technical field according to the present disclosure.

For example, the measurement section 405 may perform RRM measurements, CSI measurements, and the like based on the received signals. The measurement section 405 may measure received power (for example, RSRP), received quality (for example, RSRQ, SINR, SNR), a signal strength (for example, RSSI), propagation path information (for example, CSI), and the like. The measurement results may be output to the control section 401.

The transmitting/receiving section 203 may receive information on the UL (Uplink)/DL (Downlink) configuration (that is, TDD-UL-DL-ConfigCommon information element, TDD-UL-DL-ConfigDedicated information element, and the like) in the second carrier (for example, NR carrier). This information may be transmitted on at least one of the first carrier (for example, LTE carrier) and the second carrier. UL/DL in the present disclosure may be replaced by UL-DL, DL-UL, DL/UL, and the like.

The control section 401 may determine start timing of the UL/DL configuration in the second carrier based on the offset between the frame boundary in the first carrier and the frame boundary in the second carrier.

The control section 401 may determine the offset based on the UL/DL configuration for use in the first carrier.

The control section 401 may determine that the start timing of the UL/DL configuration in the second carrier is start timing of the longest consecutive DL portion of the UL/DL configuration for use in the first carrier.

(Hardware Configuration)

The block diagrams used for the description of the above embodiment illustrate blocks in functional units. These functional blocks (components) are achieved by any combination of at least one of hardware components and software components. Further, a method of achieving each functional block is not particularly limited. That is, each functional block may be achieved by a single apparatus physically or logically aggregated, or may be achieved by directly or indirectly connecting two or more physically or logically separate apparatuses (using wires, radio, or the like, for example) and using these plural apparatuses.

Figure 11:
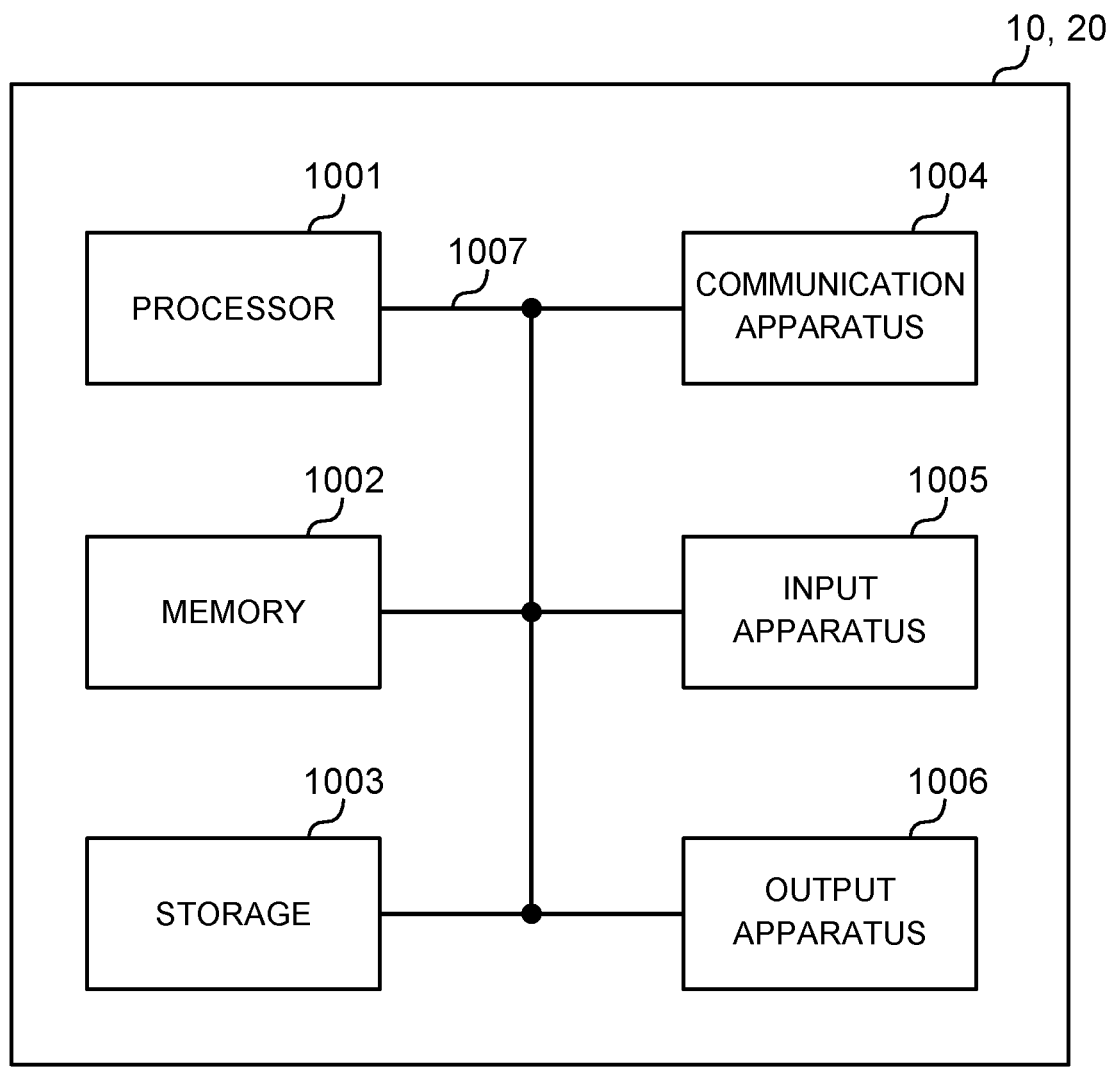
FIG. 11 is a diagram illustrating an example of a hardware configuration of each of the radio base station and the user terminal according to the embodiment.

For example, the radio base station, the user terminal, or the like in the embodiment of the present disclosure may function as a computer that performs the processing of the radio communication method of the present disclosure. FIG. 11 is a diagram illustrating an example of a hardware configuration of each of the radio base station and the user terminal according to the embodiment. Physically, each of the above-mentioned radio base station 10 and user terminal 20 may be composed as a computer apparatus including a processor 1001, a memory 1002, a storage 1003, a communication apparatus 1004, an input apparatus 1005, an output apparatus 1006, a bus 1007, and the like.

In the following description, the word "apparatus" may be replaced by "circuit", "device", "unit", and the like. The hardware configuration of each of the radio base station 10 and the user terminal 20 may be composed so as to include one or plurality of each apparatus illustrated in the drawing, or may be composed so as not to include a part of the apparatuses.

For example, although only one processor 1001 is illustrated, a plurality of processors may be provided. Furthermore, the processing may be executed by one processor, or the processing may be executed in sequence or in different manners by two or more processors. Note that the processor 1001 may be implemented by one or more chips.

Each function of the radio base station 10 and the user terminal 20 is achieved, for example, in such a manner that, by causing hardware such as the processor 1001 and the memory 1002 to read given software (program), the processor 1001 performs a computation, controls communication via the communication apparatus 1004, controls at least one of reading and writing of data in the memory 1002 and the storage 1003, and so on.

For example, the processor 1001 operates an operating system to control the whole of the computer. The processor 1001 may be composed of a central processing unit (CPU) including an interface with peripheral apparatuses, a control apparatus, a computing apparatus, a register, and the like. For example, the baseband signal processing section 104 (204), the call processing section 105 and the like, which are mentioned above, may be achieved by the processor 1001.

Furthermore, the processor 1001 reads the program (program code), a software module, data, and the like from at least one of the storage 1003 and the communication apparatus 1004, into the memory 1002, and executes a variety of processing according to these. As the program, used is a program that causes the computer to execute at least part of the operations described in the above-mentioned embodiment. For example, the control section 401 of the user terminal 20 may be achieved by a control program that is stored in the memory 1002 and operates in the processor 1001, and other functional blocks may be achieved likewise.

The memory 1002 is a computer-readable recording medium, and for example, may be composed of at least one of a ROM (Read Only Memory), an EPROM (Erasable Programmable ROM), an EEPROM (Electrically EPROM), a RAM (Random Access Memory), and other appropriate storage media. The memory 1002 may be called a register, a cache, a main memory (primary storage apparatus), and the like. The memory 1002 can store a program (program code), a software module, and the like, which are executable for implementing the radio communication method according to the embodiment of the present disclosure.

The storage 1003 is a computer-readable recording medium, and for example, may be composed of at least one of a flexible disk, a floppy (registered trademark) disk, a magneto-optical disk (for example, a compact disc (CD-ROM (Compact Disc ROM) and the like), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be called an auxiliary storage apparatus.

The communication apparatus 1004 is hardware (transmitting/receiving device) for performing inter-computer communication via at least one of a wired network and a wireless network, and for example, is referred to as "network device", "network controller", "network card", "communication module", and the like. The communication apparatus 1004 may be composed by including a high frequency switch, a duplexer, a filter, a frequency synthesizer, and the like, for example, in order to achieve at least one of frequency division duplex (FDD) and time division duplex (TDD). For example, the transmitting/receiving antennas 101 (201), the amplifying sections 102 (202), the transmitting/receiving sections 103 (203), the communication path interface 106, and the like, which are mentioned above, may be achieved by the communication apparatus 1004.

The input apparatus 1005 is an input device (for example, a keyboard, a mouse, a microphone, a switch, a button, a sensor, and the like) that receives an input from the outside. The output apparatus 1006 is an output device (for example, a display, a speaker, an LED (Light Emitting Diode) lamp, and the like) that implements an output to the outside. The input apparatus 1005 and the output apparatus 1006 may have an integrated configuration (for example, a touch panel).

Furthermore, the respective apparatuses such as the processor 1001 and the memory 1002 are connected to one another by the bus 1007 for information communication. The bus 1007 may be composed using a single bus, or may be composed using buses different between the apparatuses.

Furthermore, the radio base station 10 and the user terminal 20 may be configured by including hardware such as a microprocessor, a digital signal processor (DSP), an ASIC (Application-Specific Integrated Circuit), a PLD (Programmable Logic Device), and an FPGA (Field Programmable Gate Array), and a part or all of each of the functional blocks may be achieved using the hardware. For example, the processor 1001 may be implemented using at least one of these pieces of hardware.

Modified Example

The terms described in the present disclosure and the terms necessary to understand the present disclosure may be replaced by terms having the same or similar meanings. For example, at least one of the channel and the symbol may be a signal (signaling). Further, the signal may be a message. The reference signal may be abbreviated as RS (Reference Signal), and may be called a pilot, a pilot signal, or the like depending on a standard to be applied. Furthermore, the component carrier (CC) may be called a cell, a frequency carrier, a carrier frequency, and the like.

The radio frame may be composed of one or more periods (frames) in the time domain. Each of the one or more periods (frames) which constitute the radio frame may be called a subframe. Furthermore, the subframe may be composed of one or more slots in the time domain. The subframe may have a fixed time length (for example, 1 ms) that does not depend on numerology.

Here, the numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame configuration, specific filtering processing to be performed by a transceiver in the frequency domain, specific windowing processing to be performed by the transceiver in the time domain, and the like.

The slot may be composed of one or more symbols (OFDM (Orthogonal Frequency Division Multiplexing) symbols, SC-FDMA (Single Carrier Frequency Division Multiple Access) symbols, and the like) in the time domain. Further, the slot may be a unit of time based on numerology.

The slot may include a plurality of minislots. Each minislot may be comprised of one or more symbols in the time domain. Further, the minislot may be called a subslot. The minislot may be composed of a smaller number of symbols than that of such slots. PDSCH (or PUSCH) transmitted in a unit of time, which is larger than the minislot, may be called PDSCH (PUSCH) mapping type A. PDSCH (or PUSCH) transmitted using the minislot may be called PDSCH (PUSCH) mapping type B.

Each of the radio frame, the subframe, the slot, the minislot, and the symbol represents a unit of time at the time of transmitting a signal. Each of the radio frame, the subframe, the slot, the minislot, and the symbol may be called another name corresponding thereto.

For example, one subframe may be called a transmission time interval (TTI), or a plurality of consecutive subframes may be called the TTI, or one slot or minislot may be called the TTI. That is, at least one of the subframe and TTI may be a subframe (1 ms) in the existing LTE, may be a shorter period (for example, 1 to 13 symbols) than 1 ms, or may be a longer period than 1 ms. The unit that represents TTI may be called a slot, a mini slot, and the like, instead of the subframe.

Here, TTI refers to the minimum unit of time of scheduling in radio communication, for example. For example, in LTE systems, the radio base station performs scheduling for allocating radio resources to each user terminal in a unit of TTI, the radio resources including the frequency bandwidth, transmission power, and the like, which are usable in each user terminal. The definition of TTIs is not limited to this.

TTI may be a unit of time of transmitting channel-encoded data packets (transport blocks), code blocks, codewords, and the like, or may be a unit of processing for scheduling, link adaptation, and the like. When TTI is given, a time interval (for example, the number of symbols) in which the transport blocks, the code blocks, the codewords, and the like are actually mapped may be shorter than TTI.

When one slot or one minislot is called TTI, one or more TTIs (that is, one or more slots or one or more minislots) may be the minimum unit of time of scheduling. Moreover, the number of slots (the number of minislots) which constitute the minimum unit of time of the scheduling may be controlled.

TTI having a time length of 1 ms may be called usual TTI (TTI in LTE Rel. 8 to 12), normal TTI, long TTI, a usual subframe, a normal subframe, a long subframe, or the like. TTI shorter than the usual TTI may be called a shortened TTI, a short TTI, a partial TTI (or a fractional TTI), a shortened subframe, a short subframe, a minislot, a subslot, or the like.

The long TTI (for example, the usual TTI, the subframe, and the like) may be replaced by TTI having a time length exceeding 1 ms, and the short TTI (for example, the shortened TTI and the like) may be replaced by TTI having a TTI length less than the TTI length of the long TTI and not less than 1 ms.

The resource block (RB) is the unit of resource allocation in the time domain and the frequency domain, and may include one or plurality of consecutive subcarriers in the frequency domain.

Moreover, RB may include one or plurality of symbols in the time domain, and may be one slot, one minislot, one subframe, or one TTI in length. One TTI and one subframe may be each composed of one or more resource blocks.

One or more RBs may be called a physical resource block (PRB (Physical RB)), a subcarrier group (SCG), a resource element group (REG), a PRB pair, an RB pair, or the like.

Furthermore, the resource block may be composed of one or more resource elements (REs). For example, one RE may be a radio resource region of one subcarrier and one symbol.

Structures of the radio frames, the subframes, the slots, the minislots, the symbols, and the like, which are mentioned above, are merely examples. For example, configurations pertaining to the number of subframes included in a radio frame, the number of slots included in a subframe or a radio frame, the number of minislots included in a slot, the number of symbols and RBs, which are included in a slot or a minislot, the number of subcarriers included in RB, the number of symbols in TTI, the symbol duration, the length of cyclic prefixes (CPs), and the like can be variously changed.

Moreover, the information, the parameters, and the like, which are described in the present disclosure, may be represented in absolute values or in relative values with respect to given values, or may be represented using other applicable information. For example, a radio resource may be specified by a given index.

The names used for parameters and the like in the present disclosure are in no respect limiting. Further, formulas and the like, which use these parameters, may differ from those explicitly disclosed in the present disclosure. Since various channels (PUCCH (Physical Uplink Control Channel), PDCCH (Physical Downlink Control Channel), and the like) and information elements can be identified by any suitable names, the various names assigned to these individual channels and information elements are in no respect limiting.

The information, signals, and the like, which are described in the present disclosure, may be represented using a variety of different technologies. For example, data, instructions, commands, information, signals, bits, symbols, and chips, all of which may be referenced throughout the herein-contained description, may be represented by voltages, currents, electromagnetic waves, magnetic fields, or particles, optical fields or photons, or any combination of these.

Further, information, signals and the like can be output in at least one of a direction from upper layers to lower layers and a direction from lower layers to upper layers. Information, signals, and the like may be input and output via a plurality of network nodes.

The information, signals, and the like, which are input and output, may be stored in a specific location (for example, in a memory), or may be managed in a control table. The information, signals, and the like, which are to be input and output can be overwritten, updated, or appended. The information, signals, and the like, which are output, may be deleted. The information, signals, and the like, which are input, may be transmitted to other apparatuses.

The reporting of information is by no means limited to the aspects/embodiments described in the present disclosure, and may be performed using other methods. For example, the reporting of information may be implemented by physical layer signaling (for example, downlink control information (DCI), uplink control information (UCI)), upper layer signaling (for example, RRC (Radio Resource Control) signaling, broadcast information (master information block (MIB), system information block (SIB), and the like), and MAC (Medium Access Control) signaling), other signals or combinations of these.

The physical layer signaling may be called L1/L2 (Layer 1/Layer 2) control information (L1/L2 control signals), L1 control information (L1 control signal), and so on. Further, the RRC signaling may be called RRC messages, and may be, for example, an RRC connection setup (RRCConnectionSetup) message, an RRC connection reconfiguration (RRCConnectionReconfiguration) message, and the like. Moreover, the MAC signaling may be reported using, for example, MAC control elements (MAC CEs).

Further, reporting of given information (for example, reporting of information to the effect that "X holds") does not necessarily have to be sent explicitly, and may be sent implicitly (for example, by not reporting this given information, or by reporting another piece of information).

Determination may be made by values represented by one bit (0 or 1), may be made by Boolean values which represent true or false, or may be made by comparing numerical values (for example, comparison with a given value).

No matter whether to be called software, firmware, middleware, a microcode, or a hardware description language or to be called by other names, software should be interpreted broadly so as to mean instructions, instruction sets, codes, code segments, program codes, programs, subprograms, software modules, applications, software applications, software packages, routines, subroutines, objects, executable files, execution threads, procedures, functions, and the like.

Further, software, commands, information, and the like may be transmitted and received via transmission media. For example, when software is transmitted from a website, a server, or other remote sources using at least one of wired technologies (coaxial cables, optical fiber cables, twisted-pair cables, digital subscriber lines (DSLs), and the like) and wireless technologies (infrared radiation, microwaves, and the like), at least one of these wired technologies and wireless technologies are also included in the definition of transmission media.

The terms "system" and "network" for use in the present disclosure are usable interchangeably.

In the present disclosure, terms such as "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and "bandwidth part (BWP)" are usable interchangeably. The base station may be called a term such as a macro cell, a small cell, a femto cell, a pico cell, and the like.

The base station can accommodate one or more (for example, three) cells (also called sectors). When the base station accommodates a plurality of cells, the entire coverage area of the base station can be partitioned into a plurality of smaller areas, and each smaller area can provide communication services through base station subsystems (for example, indoor small base stations (RRHs (Remote Radio Heads))). The term "cell" or "sector" refers to part or all of the coverage area of at least one of the base station and the base station subsystem, which provides communication services within this coverage.

In the present disclosure, the terms such as "mobile station (MS)", "user terminal", "user equipment (UE)", and "terminal" are usable interchangeably.

The mobile station may be called a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be called a transmitting device, a receiving device, or the like. At least one of the base station and the mobile station may be a device mounted on a mobile body, the mobile body itself, or the like. The mobile body may be a vehicle (for example, car, airplane, or the like), a mobile body moving unmanned (for example, drone, autonomous vehicle, or the like), or a (manned or unmanned) robot. At least one of the base station and the mobile station includes a device that does not necessarily move during a communication operation.

Furthermore, the radio base stations in the present disclosure may be replaced by user terminals. For example, each aspect/embodiment of the present disclosure may be applied to a configuration in which communication between a radio base station and a user terminal is replaced by communication among a plurality of user terminals (for example, the communication may be called D2D (Device-to-Device), V2X (Vehicle-to-Everything), and the like). In this case, the user terminals 20 may have the functions of the radio base stations 10 mentioned above. Further, the words such as "uplink" and "downlink" may be replaced by a word (for example, "side") corresponding to inter-terminal communication. For example, an uplink channel, a downlink channel, and the like may be replaced by side channels.

Likewise, the user terminals in the present disclosure may be replaced by radio base stations. In this case, the radio base stations 10 may have the functions of the user terminals 20 mentioned above.

Certain actions which have been described in the present disclosure to be performed by base stations may, in some cases, be performed by upper nodes thereof. In a network including one or more network nodes having base stations, it is clear that various operations performed in order to communicate with terminals can be performed by base stations, one or more network nodes (for example, MMEs (Mobility Management Entities), S-GWs (Serving-Gateways), and the like are conceived, but these are not limiting) other than base stations, or combinations of these.

Each aspect/embodiment described in the present disclosure may be used alone, may be used in combination, or may be switched and used according to execution. Further, the processing procedures, the sequences, the flowcharts, and the like in each aspect/embodiment described in the present disclosure may be re-ordered as long as there is no contradiction. For example, regarding the methods described in the present disclosure, elements of various steps are presented using an illustrative order, and are not limited to the presented particular order.

Each aspect/embodiment described in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other appropriate radio communication methods, next-generation systems extended based thereon, and the like. Further, a plurality of systems may be combined and applied (for example, a combination of LTE or LTE-A and 5G).

The description "based on" used in the present disclosure does not mean "based on only", unless otherwise specified. In other words, the description "based on" means both of "based on only" and "based on at least".

Any references to elements using designations such as "first" and "second" used in the present disclosure do not limit the amount or order of these elements overall. In the present disclosure, these designations are usable as the useful method for distinguishing two or more elements. Hence, references of first and second elements do not mean that only two elements are adoptable, or that the first element must precede the second element in some way.

There is a case where the term of "determining" used in the present disclosure includes various types of operations. For example, "determining" may be regarded as "determining" judging, calculating, computing, processing, deriving, investigating, looking up (for example, looking up in a table, database, or another data structure), ascertaining, and the like.

Further, "determining" may be regarded as "determining" receiving (for example, receiving information), transmitting (for example, transmitting information), input, output, accessing (for example, accessing data in memory), and the like.

Furthermore, "determining" may be regarded as "determining" resolving, selecting, choosing, establishing, comparing, and the like. In other words, "determining" may be regarded as "determining" some operation.

Further, "determining" may be replaced by "assuming", "expecting", "considering", and the like.

The terms "connected" and "coupled" used in the present disclosure or any modifications thereof mean every direct or indirect connection or coupling among two or more elements, and can include the presence of one or more intermediate elements between two mutually "connected" or "coupled" elements. Coupling or connection between elements may be physical, may be logical, or may be a combination thereof. For example, "connection" may be replaced by "access".

In the present disclosure, when two elements are connected to each other, these elements can be considered "connected" or "coupled" to each other by using one or more electrical wires, cables, printed electrical connections, and the like, and, as a number of non-limiting and non-inclusive examples, by using electromagnetic energy having wavelengths in a radio frequency domain, a microwave domain, an optical (both visible and invisible) domain, and the like.

In the present disclosure, the phrase "A and B are different" may mean "A and B are different from each other". The terms such as "leave" and "coupled" may be interpreted as well.

Where the terms "include", "including", and variations thereof are used in the present disclosure, these terms are intended to be inclusive as is the term "comprising". Further, the term "or" used in the present disclosure is intended to be not exclusive OR.

For example, when articles, such as "a", "an", and "the" in English, are added by translation in the present disclosure, the present disclosure may include that nouns which follows these articles are in plural.

Now, although invention according to the present disclosure has been described above in detail, it is obvious to those skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Hence, the description of the present disclosure is provided only for the purpose of explaining examples, and should by no means be construed to limit the invention according to the present disclosure in any way.

This application is based on Japanese Patent Application No. 2018-090240 filed on Apr. 17, 2018. All of this content is included here.

The invention claimed is:

1. A terminal comprising:
a receiver that receives, by using higher layer signaling, offset information regarding an offset between a frame boundary of a first cell and a frame boundary of a second cell; and
a processor that determines the offset based on the offset information,
wherein the offset is determined based on reference subcarrier spacing.

2. The terminal according to claim 1, wherein the offset information indicates an offset value in a unit of slot used in at least one of the first cell and the second cell.

3. The terminal according to claim 1, wherein the processor determines, based on the offset information, that the frame boundary of the second cell is a position shifted by the offset from the frame boundary of the first cell.

4. The terminal according to claim 1, wherein the reference subcarrier spacing is included in common UL/DL configuration information.

5. A radio communication method for a terminal, comprising:
receiving, by using higher layer signaling, offset information regarding an offset between a frame boundary of a first cell and a frame boundary of a second cell; and
determining the offset based on the offset information,
wherein the offset is determined based on reference subcarrier spacing.

6. A base station comprising:
a processor that generates offset information regarding an offset between a frame boundary of a first cell and a frame boundary of a second cell; and
a transmitter that transmits, by using higher layer signaling, the offset information to a terminal, wherein the offset is determined based on reference subcarrier spacing.

7. A system comprising a terminal and a base station, wherein:
the terminal comprises:
a receiver that receives, by using higher layer signaling, offset information regarding an offset between a frame boundary of a first cell and a frame boundary of a second cell; and
a processor that determines the offset based on the offset information,
wherein the offset is determined based on reference subcarrier spacing, and
wherein the base station comprises:
a transmitter that transmits the offset information to the terminal.

* * * * *